Patented June 12, 1934

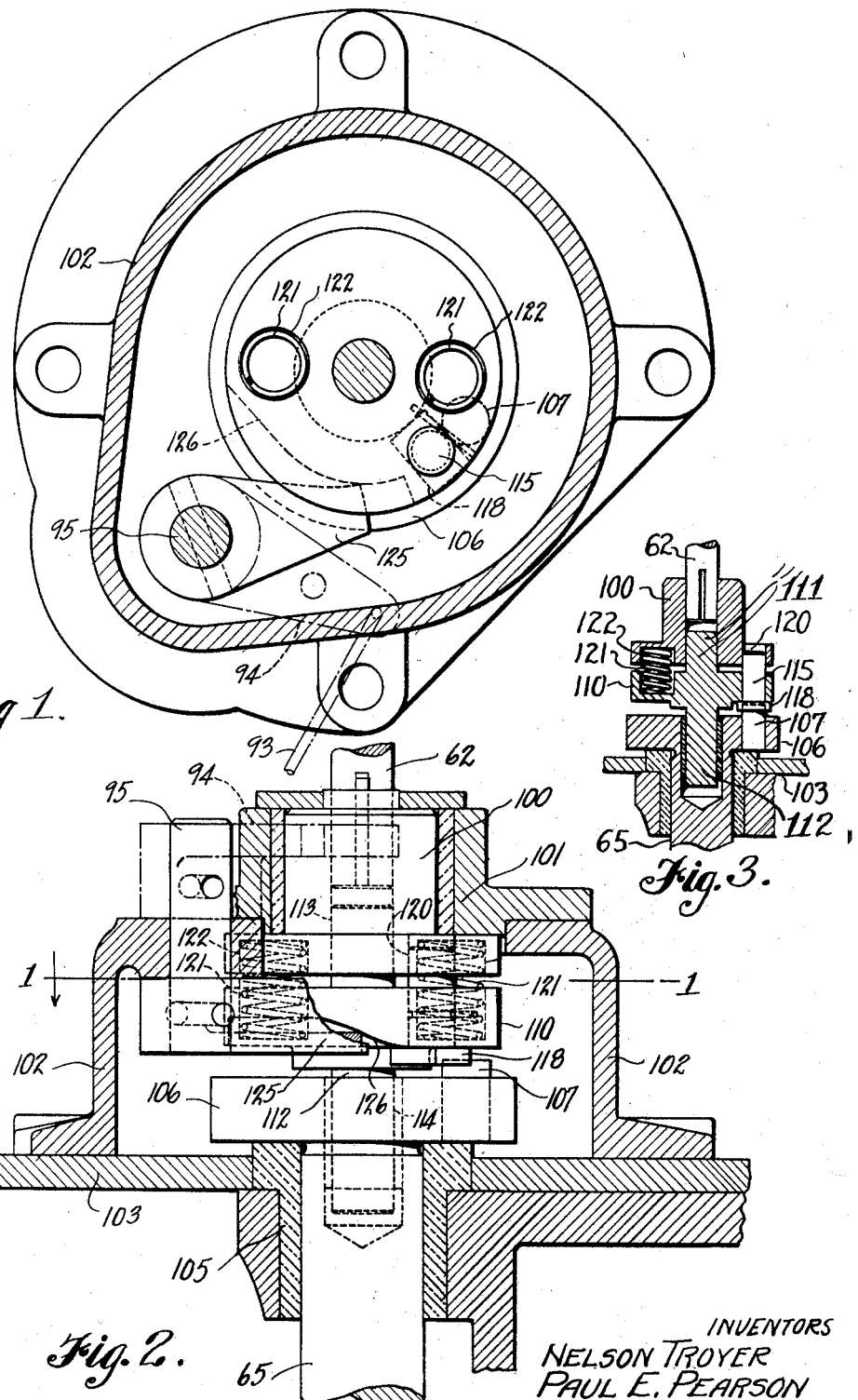

1,962,288

UNITED STATES PATENT OFFICE 1,962,288

AUTOMATIC CLUTCH FOR CAN AND COVER FEED MECHANISM

Nelson Troyer and Paul E. Pearson, Seattle, Wash., assignors to Continental Can Company, Inc.

Application September 5, 1931, Serial No. 561,494

4 Claims. (Cl. 192—25)

This invention relates to improvements in clutch mechanisms, and has for its object to provide a clutch whereby a driving connection between coaxially aligned shafts may be normally maintained, and which may be actuated to release the connection and to cause one shaft to be stopped in a definite position; the invention being applicable to various machines, but especially useful in can closing machines in connection with the cover feed mechanism.

Other objects of the invention reside in the details of construction of the parts embodied in the clutch, in their combination and mode of operation, as will hereinafter be described.

In accomplishing the objects of the invention, we have provided the improved details of construction, the preferred forms of which are illustrated in the accompanying drawing, wherein—

Figure 1 is a sectional view of the clutch device as seen on the line 1—1 in Fig. 2.

Fig. 2 is a sectional detail through the clutch housing and showing the clutch parts in side elevation.

Fig. 3 is a sectional detail of the clutch mechanism in the axial plane.

Referring more in detail to the drawing:

The present clutch mechanism is interposed between the upper end of a revolubly driven shaft 65 and the lower end of a shaft 62, that is coaxially alined therewith, and the clutch operates normally to maintain an operative driving connection between these shafts, but may be actuated to release the connection and to stop the shaft 62 at a definite position. The shaft 65 in this instance may be considered to be a driving shaft and the shaft 62 is the shaft to be driven.

The lower end of the shaft 62 is revolubly keyed within a bushing 100 which in operation is revoluble and fitted in a bearing 101, fastened to the top portion of a housing 102 which incloses the clutch mechanism and which is fastened securely to a support plate 103.

The upper end of the driving shaft 65 enters the housing 102 through a bushing 105, fitted in an opening in the plate 103, and this shaft has a disc 106 fastened thereon provided in its upper side with an eccentrically mounted stud 107. A disc 110 is disposed between the disc 106 and the lower end of the bushing 100, and this has coaxial trunnions 111 and 112 on its upper and lower faces, respectively, which are revolubly fitted within bores 113 and 114 provided therefor in the bushing 100 and disc 106.

An eccentrically located pin 115 extends through the disc 110, and this has a head 118 at its lower end which is adapted to be engaged by the stud 107 on the rotatably driven disc 106 to cause the parts to rotate together. The upper end of the pin 115 extends slidably into a bore 120 in the lower end of the bushing 100, thereby to complete the driving connection between shafts 65 and 62. Coiled springs 121 disposed in alined sockets 122 in adjacent faces of the disc 110 and bushing 100 urge the latter apart so as normally to hold the head 118 of the pin in position to be engaged by the stud 107.

Under normal conditions this driving connection is maintained. However, in the event that it is necessary or desirable to temporarily stop the operation of the shaft 62, disconnection of the shafts is effected by lifting the disc 110 so that the head 118 of the pin 115 will be moved from engagement with the stud 107. The lifting of the disc is accomplished through the rotation of a shaft 95, rotatably mounted in the housing 102 parallel with the shaft 62, and which at its lower end has an arm 125 fixed thereon and adapted to swing toward and from the disc, and the disc is provided at one side with a cam groove 126 adapted to receive the end of this arm when it swings inwardly. The groove is inclined downwardly from its receiving end and opens through the lower edge of the disc at a point just forwardly of the head of the pin 115, so that when the arm 125 is moved inwardly by rotative action of the shaft 95 and enters the groove, the disc 110 will ride upwardly on the arm, and thereby will be lifted to disengage the head 118 from its driving connection with the stud 107 to disconnect the driving connection. As this driving connection is disrupted the head of the pin engages with the end of the lever to positively stop rotation of the shaft 62.

When it is desired to again make a driving connection, the shaft 95 will be rotatably actuated so as to swing the arm outwardly from the disc and permit the springs 121 to push the disc downwardly so that the driving connection between the stud 107 and the head of the pin is again established, and driving of the shaft 62 will be resumed.

As designated in Fig. 1, the shaft 95 may be actuated through the mediacy of the lever arm 94 to which an operating rod 93 is connected.

Having thus described the invention, what we claim as new therein and desire to secure by Letters Patent is:—

1. A clutch mechanism comprising axially alined driving and driven shafts revolubly mounted with ends spaced apart, a disk, formed with a cam surface, interposed between the spaced ends in axial alinement with the shafts and mounted thereby for shifting in the axial direction of the shafts, and having a driving connection with the driven shaft, means on the disk and on the driving shaft arranged for abutting engagement to provide a releasable driving connection between the shafts, and a lever movable into contact with said cam surface of the disk to shift the disk to disrupt the driving connection.

2. A clutch mechanism comprising axially alined driving and driven shafts rotatably mounted with ends spaced apart, a disk having a peripheral cam groove, interposed between the spaced ends of the shafts in axial alinement therewith and mounted thereby to permit its being shifted in the axial direction of the shafts, and having a driving connection with the driven shaft, co-operating means arranged on the disk and driving shaft to provide a releasable driving connection between the shafts, yieldable means acting against the disk to normally maintain the connection; and a member shiftable into position to operatively engage the cam surface of the disk to effect axial shifting of the disk to disrupt the driving connection then to stop rotation thereof.

3. A clutch mechanism comprising axially alined driving and driven shafts rotatably mounted with ends spaced apart, a disk interposed between said spaced ends and mounted thereby to permit shifting of the disk axially of the shafts, a pin through the disk maintaining a permanent driving connection with the driven shaft, an abutment on the disk, an eccentric stud on the driving shaft engageable with the abutment to complete a releasable driving connection between the shafts; said disk having a peripheral cam slot terminating at the abutment, and a lever arm movable into a position for entering and following within the slot to shift the disk axially to disrupt the releasable driving connection and to then engage the abutment to positively stop the disk and driven shaft.

4. A clutch mechanism comprising axially alined driving and driven shafts, rotatably mounted with ends spaced apart, and formed with axially alined sockets, a disk interposed between said spaced ends and having axial trunnions mounted in said sockets permitting axial shifting of the disk, a pin fixedly mounted in the disk eccentrically thereof and maintaining a driving connection with the driven shaft, an abutment on the disk, a stud mounted eccentrically in the end of the driving shaft to engage the abutment to effect a releasable driving connection with the disk, yieldable means acting against the disk to normally maintain the latter connection; said disk having a peripheral cam slot leading axially thereof and terminating at the abutment, and a shifting arm mounted adjacent the disk and movable into the slot to follow therealong to effect shifting movement of the disk to disrupt the driving connection and engage the abutment to stop rotation of the disk.

NELSON TROYER.
PAUL E. PEARSON.